United States Patent [19]

Bell et al.

[11] Patent Number: 5,204,155
[45] Date of Patent: Apr. 20, 1993

[54] RESILIENT FOAM-BACKED CARPET AND METHOD OF PREPARATION

[75] Inventors: Peter W. Bell, Troon, Scotland; Johannes A. H. Claessen, Leusden, Netherlands

[73] Assignee: Interface, Inc., La Grange, Ga.

[21] Appl. No.: 790,370

[22] Filed: Nov. 12, 1991

[51] Int. Cl.$^5$ .......................... B32B 3/02; B32B 3/26; B32B 5/20; B32B 31/00
[52] U.S. Cl. ........................................ 428/95; 428/85; 428/314.4; 428/318.8; 428/489; 156/60
[58] Field of Search ............. 428/95, 85, 314.4, 318.4, 428/489; 156/60

[56] References Cited

U.S. PATENT DOCUMENTS

| | | | |
|---|---|---|---|
| 3,802,950 | 4/1974 | Stevens | 428/489 X |
| 3,919,444 | 11/1975 | Shayman | 428/95 |
| 4,010,301 | 3/1977 | Anderson et al. | 428/95 |
| 4,186,230 | 1/1980 | Sinclair et al. | 428/95 |
| 4,357,377 | 11/1982 | Yamamoto | 428/318.4 X |
| 4,503,106 | 3/1985 | Cogliano | 428/489 X |
| 4,721,643 | 1/1988 | Harayama et al. | 428/95 X |
| 4,830,916 | 5/1989 | Fukuda et al. | 428/95 X |
| 4,882,208 | 11/1989 | Breitscheidel et al. | 428/95 X |

Primary Examiner—George F. Lesmes
Assistant Examiner—Terrel Morris
Attorney, Agent, or Firm—Richard P. Crowley

[57] ABSTRACT

A floor covering, such as a carpet or carpet tile, which comprises a primary backing sheet having a fibrous face wear surface and back surface and first and second backing layers and with a low density, resilient, non-elastomeric, closed cell polymeric foam layer, such as a thermoset, cross-linked polyethylene foam layer, positioned between and bonded to the first and second backing layers, optionally with a secondary backing layer bonded to the secondary bitumen backing layer. A method of producing a floor covering, such as a carpet tile, which comprises providing a primary backing sheet having a fibrous face wear surface and a back surface and bonding a first bitumen backing layer onto the primary backing sheet, bonding a low density, thermoset, polymeric foam layer to the first bitumen backing layer through a glass tissue to protect the polymeric foam layer and stabilize the composite, and bonding a second bitumen backing layer onto the polymeric foam layer. The second bitumen layer being beyond to a non-woven base wets through a glass tissue to protect the subfloor and stabilize the composite.

29 Claims, 1 Drawing Sheet

RESILIENT FOAM-BACKED CARPET AND METHOD OF PREPARATION

BACKGROUND OF THE INVENTION

Floor surface covering materials, such as carpets, and more particularly carpet tiles, typically comprise a traffic-bearing or wear face surface on a primary backing, such as a fibrous face surface, which has been woven, needle-punctured, fusion-bonded or otherwise secured to a primary backing layer or sheet, and a back surface to which is bonded one or more layers of solid or foam backing material. A solid backing material typically comprises a polyvinyl chloride backing material or a bitumen or atactic polypropylene backing layer, which are thermoplastic-type materials and which require different techniques in the coating process due the nature of the backing materials. Foam backing layers usually comprise a soft, resilient foam material, such as a polyvinyl chloride foam, a urethane foam or an elastomer latex-type foam, such as a styrene-butadiene-styrene rubber foam, to provide a resilient cushioning effect, and which foam is secured by an adhesive layer to the backing layer or directly to the back surface of the primary backing layer. The foam backing layer is selected to be resilient, i.e. elastomeric in properties, and to have a high compression strength and a low compression set, that is, the foam will upon compression rebound quickly or retain its original dimensions after repeated or prolonged use so as not to deform the face of the carpet, such as for example where chair or table legs are placed on the face surface of the carpet for short or extended time periods. Such floor surface coverings may also optionally have embossed back surfaces or have secondary backing layers, such as polyester or polypropylene layers, applied to the back surface of the floor surface material. The covering also may include for example continuous or discontinuous, pressure-sensitive adhesive material with or without a release sheet for securing the surface covering to the substrate to which it is going to be applied.

It is desirable to provide for a new and improved foam-containing floor surface covering material and method of preparation which employs foam material in the backing layer and to provide a lightweight, resilient, cushioned floor surface covering material, particularly a foam-containing, backed carpet tile.

SUMMARY OF THE INVENTION

The invention relates to a foam-backed floor covering material, particularly carpet tile, and to a method of preparing such floor covering material. In particular, the invention relates to a fibrous face wear surface carpet tile having a composite, foam-containing sandwich construction as the backing layer of the carpet tile.

The invention comprises a foam-backed floor covering, particularly a carpet tile, such as a fibrous sheet material or thermoplastic layer, composed of a primary backing layer having a fibrous wear or traffic-bearing face surface, such as a needle-punched, tufted, fusion-bonded or other fibrous material secured to or in the primary backing layer or sheet, with the backing sheet having a back surface. Where the backing layer comprises a fibrous primary backing sheet, it is optionally coated with a precoat layer, such as for example, with a latex precoat, like a carboxylated styrene-butadiene rubber precoat layer, to secure the back surface of the fibers in place. The floor covering has a composite sandwich-type backing layer secured to the back of the primary backing composed of first and second solid thermoplastic backing layers, and a polymeric foam layer positioned and bonded between the first and second solid backing layers, and optionally, containing a secondary backing layer bonded to the second solid backing layer exposed surface or an embossed back surface or an adhesive-containing back surface layer.

In particular, the invention comprises a carpet tile which includes a primary sheet having a fibrous face wear surface and a back surface and a first, solid thermoplastic backing layer, such as a backing layer composed of a bitumen, and particularly a polymer-modified bitumen, bonded to the back surface of the primary backing sheet, and a second, solid thermoplastic backing layer, also preferably of bitumen, and particularly a polymer-modified bitumen backing layer, and a polymeric foam layer, such as particularly as a substantially closed cell, cross-linked olefin, e.g. polyethylene layer, e.g. an irradiation or chemically thermoset, closed cell, cross-linked polymer, sandwiched, positioned and bonded between the first and second bitumen backing layers.

The polymeric foam layer may comprise a wide variety of resilient or cushioning-type foam layers to impart a resilient or floor cushioning effect to the floor covering. Typically, the foam layer will comprise a closed cell or substantially closed cell, for example over 80% to 90% closed cell, content. Where the foam layer is composed of low density, e.g. less than about 12 pounds per cubic foot of a non-elastomeric polymer, particularly of low compressive strength and high compressive set, i.e. subject to distortion, the foam is not satisfactory in a carpet backing layer. It is normally expected that such foam layers, if used as an underlayer in a carpet or floor covering material, will be unsatisfactory due to the breakdown of the cellular structure of the foam layer on use and in time. Generally, such foam layers breakdown under the downward and laterally mechanical forces exerted on the foam layer in use. It has been found that polymeric foam layers, particularly those closed cell foam layers not usually employed in carpet backing, may be employed by employing a composite, sandwich-type construction when the polymer foam layer is bonded to and disposed between solid backing layers to form a composite, solid-foam-solid backing layer for a floor covering wherein the mechanical forces are dispersed to prevent cellular damage to the foam layer.

Also, it has been discovered that the foam layer may be protected further and isolated from excessive or pinpoint mechanical forces on the face surface of the resulting floor covering by the use of a first protective one or more woven or non-woven fibrous sheet material in the first thermoplastic backing layer, i.e. on top of the foam layer, such as a glass fiber tissue sheet material, e.g. porous, non-woven, resin-bonded, lightweight, tissue sheet material, which also serves to provide dimensional stability to the first top thermoplastic layer of the floor covering. The first protective sheet material prevents point load damage to the foam layer and also serves as a glass fiber sheet to protect the foam layer from the heat of the molten backing layer during manufacture. The protective layer may be placed within the first top thermoplastic layer, but generally is positioned directly adjacent the top surface of the polymeric foam layer. The relatively stiff, e.g. bitumen, first and second backing layers spread any mechanical force on the foam layer to permit the use of the foam layer which normally could not be employed as a carpet underlay material. Also, the second thermoplastic backing layer may include one or more second protective sheet materials, such as a fibrous non-woven or woven sheet material, alone or in combination, such as glass fiber tissue sheet material, non-woven polyester and non-woven polypropylene sheet material. Such sheet material may also have the function of heat shielding the foam layer or imparting dimensional stability to the second thermoplastic backing layer. The second protective sheet material may be at the back surface of the second thermoplastic backing layer as a secondary backing layer or adjacent the lower surface of the foam layer.

It has been discovered that non-elastomeric polymeric foams of low density and which are characterized by low compression strength and high compression set and which previously had been thought to be unusable in connection with floor coverings may be successfully employed in floor coverings as a foam backing layer for floor surfaces, when the polymeric foam layer with little or no resilience is sandwiched between solid thermoplastic backing layers of sufficient thickness to spread the mechanical forces. For example, low density, cross-linked polyethylene foam is characterized by low compression strength and high compression set and is of a substantially closed cell nature and is not employed directly as a foam layer on the back of a floor surface covering. The application of a force upon the fibrous face surface of the floor surface covering with it cross-linked polyethylene foam backing would, in time, distort the foam backing layer by the weight of the object placed thereon, and impart a generally temporary or permanent indentation in the floor surface covering. However, it has been unexpectedly found that where such a low density polymeric foam material is sandwiched between solid backing layers in a floor surface covering, the compressive force of an object on the polymeric foam layer in the sandwich is sufficiently dispersed by the use of the sandwich-type construction so as to overcome the lesser resilient low density characteristic of the foam layer, thus permitting the foam layer to be successfully employed for example in carpet tile to provide a lightweight, but cushioning layer to the carpet.

The polymeric foam layer is a polymeric foam material characterized by a low density, for example, optionally having a range of from about 4 to 12 pounds per cubic foot (pcf) and such as for example, 4 to 8 to 10 pcf, and which foam is composed of a non-elastomeric material and has a low compression strength and high compression set such that if employed without the sandwich construction would be unsatisfactory for use. In one embodiment, the polymeric foam comprises a foam having thermoset-type properties and closed cell or substantially closed cell in nature. While not wishing to be limited to any particularly type of foam material, it has been found that cross-linked, olefin-type foam polymers, and particularly cross-linked polyethylene or other ethylene copolymer foams, as well as styrene-based-type foams, such as polystyrene or styrene co-polymers and semirigid non-elastomeric urethane foams are useful as a foam layer of the floor surface covering. The preferred foam material embodiment is a closed cell, low density (4-6 pcf), low cost, cross-linked ethylene polymer foam, such as irradiated polyethylene foam.

The sandwich-type carpet construction may be prepared in a sequence or separately prepared and then laminated to the back of a primary backing layer, i.e. sheet, to form the floor surface covering. Generally, the thickness of the first and second solid coating layer should be sufficient to distribute the compressive weight of objects placed on the wear or traffic face surface of the floor surface covering and generally would range for example from about 0.5 mm to 4 mm in thickness, such as 0.8 mm to 2 mm in thickness, and ranging in weight from about 500 g/m$^2$ to 4000 g/m$^2$, for example 1000 g/m$^2$ to 1500 g/m$^2$. The density of the SBS-modified bitumen compound ranges for 1.0 g/cm$^2$ to 1.6 g/cm$^2$ depending on the limestone content, which means that 1 mm ranges from 1000 g/m$^2$ to 1600 g/m$^2$. The thickness of the polymeric foam layer should be sufficient to provide the desired resilience, weight and bulk to the floor surface covering and generally would range from about 2 mm to 16 mm, for example, 4 mm to 10 mm, and ranging in weight from about 100 g/m$^2$ to 500 g/m$^2$, such as for example from 125 g/m$^2$ to 450 g/m$^2$. Generally, the thickness of the first or second layer does not exceed the thickness of the foam layer to ensure adequate cushioning and carpet resilience, and preferably the total thickness of the first and second layer is about the same or less than the foam thickness.

In one embodiment, the first and second backing layers comprise a bitumen-type backing layer, which backing layer may include therein a glass fiber tissue or scrim-type protective material to aid in providing dimensional stability to the backing layer and protection to the foam layer. The first and second backing layers may be prepared from the same or different material and may be the same or different thickness provided only that the thickness and material is such as to permit the use of the polymeric foam layer therebetween. The first and second backing layers preferably should be easily bonded to the polymeric foam layer, and where bonding does not readily occur between the selected first and second backing layers and the selected foam layer, then one or more thin, adhesive layers may be used, for example, of 0.05 mm to 0.1 mm. Typical adhesive layers include solvent-type reactive and contact adhesive and more particularly reactive epoxy or urethane-type adhesive to provide for a secure bonding between the bitumen first and second backing layers and for example, the cross-linked polyethylene layer where straight run or oxidized, that is, blown bitumen, are employed. If required, the surface of the foam layer maybe treated, such as by chemicals or corona discharge, to enhance the bonding properties of the foam layer.

In one preferred embodiment of the invention wherein first and second backing layers comprise bitumen, the foam layer includes a cross-linked, thermoset, olefinic foam layer, such as a cross-linked polyethylene layer. The use of adhesive tie layers may be often omitted, where the bitumen is an SBS or polyethylene polymer-modified bitumen, since such polymer-modified bitumen provides for generally good bonding strength directly between the surfaces of the cross linked foam layer and the polymer-modified first and second bitumen layers. Polymer-modified bitumen layers typically comprise a compatible polymer dispersed in to the bitumen in an amount generally ranging from 2% to 15% by weight of the bitumen, for example, 4% to 12% by weight of the bitumen, to modify the adhesive, viscosity, flow and penetration properties of bitumen. For the purposes of illustration only, it has been found that polymer-modified bitumen used as a backing layer is described in U.S. Pat. No. 4,201,812, issued May 6, 1980, provides for good bonding directly between the surface of the cross-linked polyethylene foam and the polymer-modified bitumen layers. The polymer-modified bitumen as described and disclosed in such patent is comprised of styrene-butadiene block thermoplastic copolymers which also may include inert filler material, calcium carbonate or other additive, such as plasticizers, oils, flame retardants, etc. therein to modify the bitumen, wherein the resulting bitumen generally has a penetration value of from about 1 to 30 (0.1 mm) at 25° C. Other polymer-modified bitumens, such as bitumen modified by polyethylene, urethane or other polymers, may be employed to provide for the direct bonding of the polymeric foam layer to the first and second bitumen backing layers, such as for example, a mixture of high and low density polyethylene, as a modified, straight-run bitumen backing layer.

Generally, in the preparation of floor coverings, particularly fibrous face carpet tile having a bitumen or PVC backing layer, a secondary backing is employed, or optionally the back surface may also contain a pressure-sensitive adhesive and a release sheet thereon to permit the self-adhesive installation of the floor covering directly to a substrate. The secondary backing sheet may comprise a single or composite backing sheet, for example, a backing sheet composed of a polyester or a combined polyester-polypropylene or a polypropylene, fibrous, non-woven secondary backing layer used alone or in combination directly with a glass tissue sheet material, such as for example described in U.S. Pat. No. 5,030,497, issued Jul. 9, 1991.

The floor surface covering of the invention are prepared by providing a primary backing layer having a wear face surface and a back surface and optionally, where required, a back surface with a precoat layer of a latex material, and thereafter, applying a first thermoplastic backing layer, and thereafter, applying a preformed, low density, polymeric foam layer to the hot, tacky, partially melted surface of the backing layer which will bond to the backing layer, employing an adhesive tie layer where required to the solid first backing layer, and thereafter, applying a second thermoplastic backing layer, and thereafter applying a secondary backing sheet to the tacky surface of the second backing layer onto the other surface of the foam layer. Optionally, the polymeric foam layer may be coated with first and second backing layers and then subsequently have one surface heat laminated or adhesively laminated to the back of the primary backing sheet. Typical methods employed for production of the surface coverings, such as a carpet tile, are as set forth for example in U.S. Pat. No. 4,582,554, issued Apr. 15, 1986 and U.S. Pat. No. 4,702,950, issued Oct. 27, 1987.

The invention will be described for the purposes of illustration only in connection with certain embodiments; however, it is recognized that those persons skilled in the art may make various additions, changes, modifications and improvements to the embodiments so described and the method of production, all without departing from the spirit and scope of the invention.

DESCRIPTION OF THE EMBODIMENTS

Figure 1:
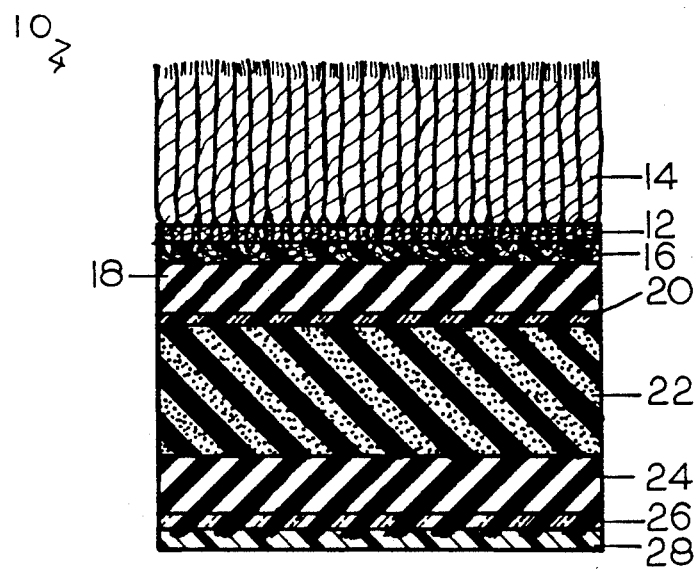
FIG. 1 is a schematic, illustrated, cross sectional view of a fibrous carpet tile of the invention.

The drawing shows a carpet tile 10 of the invention containing a primary backing layer composed of a fabric 12 having a fibrous, tufted face 14 and a fibrous back surface which has been precoated with a thin precoat layer 16 of a carboxylated styrene-butadiene rubber latex precoat which contains a first layer 18 of a styrene-butadiene-styrene block copolymer modified bitumen layer which contains therein a stabilizing, porous, non-woven, glass fiber tissue or scrim protective sheet material 20, a low density, closed cell, non-elastomeric, cross-linked polyethylene foam layer 22 bonded between the first and second SBS-bitumen layers 18 and another styrene-butadiene-styrene modified bitumen layer 24 with the cross-linked polyethylene foam being directly bonded to the modified bitumen layers 18 and 24 without the need for an adhesive tie coats. The secondary backing layer comprises a porous, glass fiber, non-woven tissue sheet material 26 directly bonded by the bitumen layer 24 forced through the glass tissue sheet material and to a non-woven polyester or polypropylene secondary backing layer 28 to provide a lightweight, resilient carpet tile.

The described embodiment relates to a needlepunched or tufted carpet, but the sandwich construction may also be employed to prepare fusion-bonded carpet and carpet tile wherein the face fibers are embedded in a thermoplastic layer whereby the primary backing sheet is a polymeric thermoplastic, e.g. PVC or EVA layer, with a fibrous face wear surface.

In one example, the carpet 10 may comprise a layer 16 of about 800 g/m²±, a first modified bitumen layer 18 of about 1300 g/m², a cross-linked polyethylene foam layer 22 having a density of 4 to 8 pcf, e.g. of about 175 g/m², a glass fiber tissue 20 and 26 of about 32-35 g/m², and a second modified bitumen layer 24 of about 1300 g/m² with the secondary backing sheet 28 composed of a polyester or spun-bonded polypropylene having a weight of about 50 g/m².

One example of an irradiation, cross-linked polyethylene foam layer comprises an Alveolit ® foam layer #1503 (Alveolit is a registered trademark of The Sekisui Group) having a density of about 0.67 kgm/m² and the following properties:

| Compression set | | |
|---|---|---|
| 22 h charge 23° C. (296 K) | 53572 | % |
| deflection 25% | | |
| ½ h after discharge | | 14 |
| 24 h after discharge | | 3 |
| deflection 50% | | |
| ½ h after discharge | | 38 |
| 24 h after discharge | | 10 |

Foam layers suitable for use includes those foam layers having compression set at 25% deflection after 24 hours of 3 or greater and at 50% deflection for 24 hours of 10 or greater and a compressive strength at 50% deflection of 150 or less.

Figure 2:
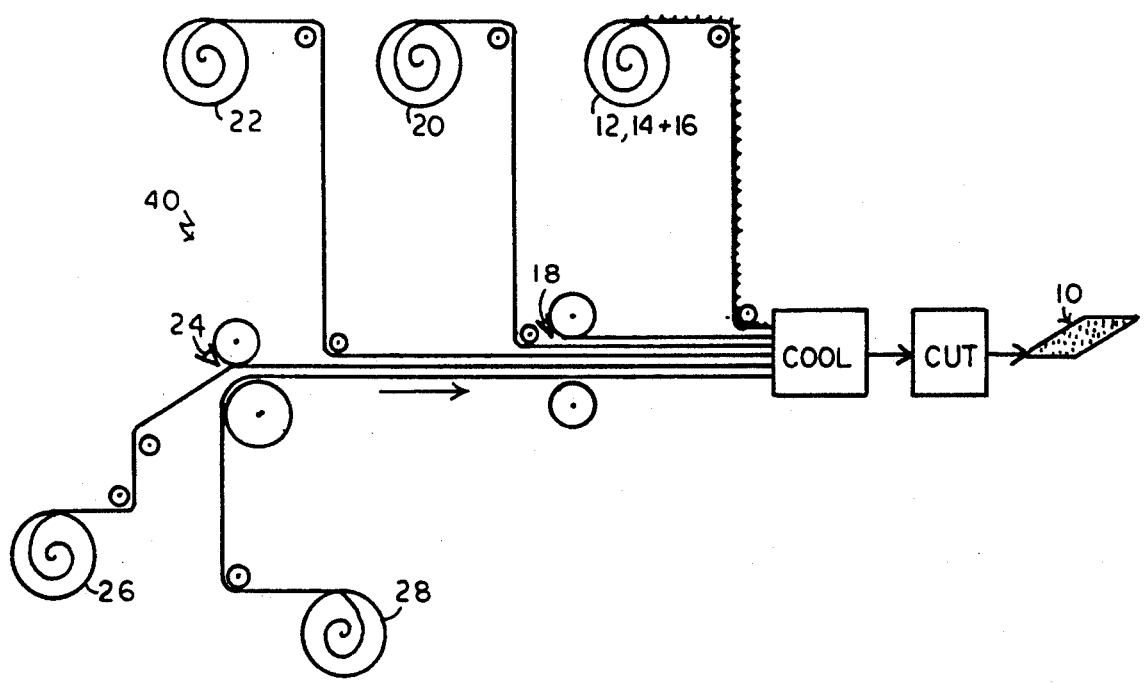
FIG. 2 is an illustrative, schematic process flow diagram of the method of preparing the carpet tile of FIG. 1.

FIG. 2 is an illustrative view of the process 40 for preparing the carpet tile 10 of FIG. 1 which comprises feeding the polypropylene sheet material 28 and the porous glass fiber tissue sheet material 26 into a pair of rollers and applying a hot melt bitumen composition 18 of SBS-modified bitumen with a limestone filler at 150° C. to 165° C. into the roller nip to form a molten bitumen layer 18 which penetrates the heat shielding tissue sheet 26 and partially penetrates the secondary backing sheet 28. The polyethylene foam layer 22, optionally corona discharged surface treated, is then laid onto the tacky surface of the bitumen layer 18 and a layer of glass fiber tissue sheet material 20 placed on the top surface of the foam layer 22. Another hot, molten, SBS-limestone bitumen composition 24 is coated onto the top surface of the tissue sheet material 20 and forced by nip rollers to penetrate the tissue sheet material 20 and to bond the foam layer 22. A precoated fibrous face carpet material (12, 14 and 16) is then placed on top of the tacky surface of the bitumen layer 24, and the resulting material then cooled to solidify and bond the bitumen layers 18 and 24 and the cooled material cut into carpet tiles 10.

The resulting floor covering employing the sandwiched foam layers provides for a lightweight, effective floor surface covering which permits the employment of a lightweight foam material to provide an effective floor covering, such as a carpet tile.

We claim:

1. A floor covering which comprises:
   a) a primary backing layer having a fibrous face wear surface and a back surface;
   b) a first solid thermoplastic backing layer;
   c) a second solid thermoplastic backing layer; and
   d) a polymeric foam layer characterized by high compression set and a substantially closed-cell structure, the foam layer positioned and secured between the first and second thermoplastic backing layers, the thermoplastic backing layer being of sufficient thickness, to disperse the mechanical force on the foam layer and to protect the polymeric foam layer from substantial cellular breakdown in use, and the polymeric foam layer of sufficient thickness to provide a lightweight, cushioning floor covering.

2. The floor covering of claim 1 wherein the floor covering comprises a flat, dimensionally stable, carpet tile.

3. The floor covering of claim 1 wherein the first and second thermoplastic backing layers comprise bitumen backing layers.

4. The floor covering of claim 1 wherein the first or second, or both, thermoplastic backing layers comprise a polymer-modified bitumen to provide for direct adhesion of the polymer-modified bitumen backing layers to the surfaces of the polymeric foam layer.

5. The floor covering of claim 4 wherein the polymer-modified bitumen backing layer comprises from about 1% to 15% by weight of a polymer selected from a group consisting of: polyethylene, polyurethane, and styrene-butadiene-styrene thermoplastic block copolymers.

6. The floor covering of claim 1 wherein the polymeric foam layer comprises a substantially closed cell, thermoset, olefinic polymeric foam layer.

7. The floor covering of claim 1 wherein the polymeric foam layer comprises a cross-linked, thermoset polyethylene foam layer.

8. The floor covering of claim 1 wherein the polymeric foam layer has a thickness of from about 4 mm to 16 mm.

9. The floor covering of claim 1 includes a primary backing layer having a fibrous back surface with a styrene-butadiene-styrene latex precoat layer on the back surface of the primary backing layer.

10. The floor covering of claim 1 wherein the first thermoplastic backing layer includes therein a protective glass fiber tissue sheet material directly adjacent the top surface of the polymeric foam layer.

11. The floor covering of claim 1 which includes a secondary backing layer which comprises a composite layer composed of a glass fiber tissue sheet material and a polyester or polypropylene sheet material as the exterior backing layer bonded by the second thermoplastic backing layer through the glass fiber tissue sheet material and into the polyester or polypropylene secondary backing layer.

12. The floor covering of claim 1 wherein the first and second thermoplastic backing layers range in thickness from about 0.5 mm to 4 mm.

13. The floor covering of claim 1 which includes a first and second adhesive tie layer bonded respectively to the first and second thermoplastic backing layers to bond adhesively the polymeric foam layer to the surface of the first and second thermoplastic backing layers.

14. The floor covering of claim 1 wherein the polymeric foam layer comprises a substantially closed cell, irradiated, cross-linked polyethylene foam layer having a density of from about 4 to 12 pcf.

15. The floor covering of claim 1 wherein the first and second thermoplastic backing layers include a porous, non-woven, glass fiber tissue sheet material.

16. The floor covering of claim 1 wherein the polymeric foam layer comprises a polymeric foam material having a low density of 4 to 12 pcf and a substantially closed cell structure.

17. The floor covering of claim 1 wherein the total thickness of the first and second backing layers does not exceed the thickness of the polymeric foam layer.

18. The floor covering of claim 17 wherein the thickness of the first and second backing layers is of about the same thickness.

19. The floor covering of claim 1 wherein the polymeric foam layer comprises a polymeric foam material having a compression set of 10 or greater, after 50% deflection for 24 hours, and a compression set of 3 or greater, after 25% deflection for 24 hours.

20. The floor covering of claim 1 wherein the polymeric foam layer has over about 80% closed-cell structure.

21. A carpet-tile floor covering which comprises:
   a) a primary backing sheet having a fibrous face wear surface and a back surface;
   b) a first, solid, bitumen backing layer;
   c) a second, solid, bitumen backing layer;
   d) a polymeric foal layer which comprises an olefinic, thermoset, substantially closed-cell, foam material having a foam density of 4 to 12 pcf, and characterized by high compression set and bonded between the first and second backing layers;
   e) a protective sheet material on the top surface of the polymeric foam layer; and
   f) the polymeric foam layer having a thickness of from about 4 to 16 mm, and the first and second backing layers each having a thickness of from about 0.5 mm to 4 mm.

22. A method of preparing a floor covering, which method comprises:
   a) providing a primary backing layer having a fibrous face wear surface and a back surface;

b) bonding a first solid thermoplastic layer to the back surface of the primary backing layer;

c) bonding one surface of a polymeric foam layer to the first thermoplastic backing layer, the polymeric foam layer characterized by a high compression set and a substantially closed-cell structure; and d) bonding a second solid thermoplastic layer to the other surface of the polymeric foam layer, the first and second backing layers of sufficient thickness to disperse the mechanical force on the foam layer, and to provide a floor covering, with the first and second thermoplastic backing layers providing protection of the polymeric foam layer from excessive compressive set.

23. The method of claim 22 wherein the first and second thermoplastic backing layers comprise polymer-modified bitumen backing layers which adhere directly to the surface of the polymeric foam layer.

24. The method of claim 22 wherein the polymeric foam layer comprises a cross-linked polyethylene layer.

25. The method of claim 22 which includes employing adhesive tie layers to bond the surfaces of the polymeric foam layer to the first and second thermoplastic backing layers.

26. The method of claim 22 which includes separately preparing the first and second thermoplastic backing layers and the polymeric foam layer and thereafter laminating one surface of the first thermoplastic backing layer to the back surface of the primary backing sheet.

27. The method of claim 22 which includes placing a glass fiber tissue sheet material onto the surface of the polymeric foam layer and between the foam layer and the first thermoplastic backing layer.

28. The method of claim 22 which includes placing glass fiber tissue sheet material in the first and second thermoplastic backing layers.

29. The floor covering material produced by the method of claim 22.

* * * * *